United States Patent [19]

Kanda

[11] Patent Number: 4,871,151
[45] Date of Patent: Oct. 3, 1989

[54] FLUID-FILLED RESILIENT BUSHING
[75] Inventor: Ryouji Kanda, Inuyama, Japan
[73] Assignee: Tokai Rubber Industries, Ltd., Japan
[21] Appl. No.: 172,382
[22] Filed: Mar. 24, 1988

Related U.S. Application Data

[63] Continuation-in-part of Ser. No. 66,017, Jun. 24, 1987, Pat. No. 4,749,173.

[30] Foreign Application Priority Data

Jun. 30, 1986 [JP] Japan ................. 61-100815

[51] Int. Cl.$^4$ ............ F16M 1/02; F16M 5/00
[52] U.S. Cl. ................ 267/140.1; 248/562
[58] Field of Search ............ 267/140.1, 140.2, 140.5, 267/141, 141.2, 35, 259, 219; 180/300, 312, 902; 248/562, 636

[56] References Cited

U.S. PATENT DOCUMENTS

| 3,642,268 | 2/1972 | Hipsher. | |
|---|---|---|---|
| 3,698,703 | 10/1972 | Hipsher | 267/140.1 X |
| 4,630,806 | 12/1986 | Dan et al. | 267/140.1 |
| 4,690,389 | 9/1987 | West | 248/562 X |
| 4,693,456 | 9/1987 | Kanda | 267/140.1 |
| 4,700,934 | 10/1987 | Andra et al. | 267/141.2 X |
| 4,702,346 | 10/1987 | Uno et al. | 267/140.1 X |
| 4,749,173 | 6/1988 | Kanda | 267/140.1 |

FOREIGN PATENT DOCUMENTS

| 3239963 | 5/1984 | Fed. Rep. of Germany. | |
|---|---|---|---|
| 2495718 | 6/1982 | France. | |
| 2582067 | 11/1986 | France. | |
| 0037349 | 2/1984 | Japan | 267/140.1 |
| 0139507 | 7/1985 | Japan | 248/562 |
| 0270533 | 11/1986 | Japan | 248/636 |
| 2055172 | 2/1981 | United Kingdom. | |

Primary Examiner—Andres Kashnikow
Assistant Examiner—Richard Potosnak
Attorney, Agent, or Firm—Oliff & Berridge

[57] ABSTRACT

A fluid-filled resilient bushing is disclosed, which includes a resilient member interposed between inner and outer sleeves, and an elastically yieldable partition member disposed in an axial void which is formed in the resilient member and extends over an entire axial length of the same. The resilient member and the partition member cooperate with the outer sleeve to fluid-tightly define a pressure-receiving chamber and an equilibrium chamber, which are disposed opposite to each other in a vibration-input direction in which the bushing receives a vibrational load. The chambers are filled with incompressible fluid and communicate with each other through an orifice. The inner and outer sleeves are disposed in eccentric relation with each other in the vibration-input direction.

9 Claims, 3 Drawing Sheets

FLUID-FILLED RESILIENT BUSHING

This application is a Continuation-In-Part Application of U.S. Ser. No. 066,017 filed June 24, 1987 now U.S. Pat. No. 4,749,173.

BACKGROUND OF THE INVENTION

1. Field of the Invention

The present invention relates in general to a fluid-filled resilient or elastic bushing structure, and more particularly to improvements in durability of the resilient or elastic member employed in the bushing and in vibration damping and isolating capability of the bushing.

2. Discussion of the Prior Art

There is known a resilient bushing for elastically connecting two members in a vibration system (through which vibrations are transmitted), for damping and/or isolating vibrations applied to the bushing in a given diametric direction of the bushing. The bushing has an inner sleeve in which a mounting rod or bolt is inserted, an outer sleeve on which a cylindrical mounting member is fitted, and a resilient member interposed between the inner and outer sleeves. For example, such a resilient bushing is used as a suspension bushing in a suspension system of an automotive vehicle, or an engine mount for mounting a power unit on the body of an F—F vehicle (front-engine, front drive vehicle).

Moreover, a fluid-filled resilient bushing has been proposed in recent years. An example of such a fluid-filled bushing is disclosed in U.S. Pat. No. 3,642,268. This bushing has a pair of fluid chambers formed in a resilient member such that the fluid chambers are located opposite to each other in a diametric direction of the bushing in which vibrations are applied. These fluid chambers are filled with a suitable incompressible fluid, and communicate with each other through an orifice, so that the fluid may flow through the orifice between the two chambers.

In the fluid-filled bushing indicated above, however, a portion of the resilient member is tensed when the bushing is mounted in place, i.e., placed under static load 1G, and consequently a comparatively large tensile strain is produced in the tensed portion of the resilient member. This disadvantage is common to another type of conventional fluid-filled bushing as disclosed in U.S. Pat. No. 3,698,703, in which the inner and outer sleeves are disposed in eccentric relation with each other such that the inner and outer sleeves are brought into concentric relation with each other when the bushing is mounted in place, for example, between a body of a vehicle and a power unit including an engine. To the "static" tensile strain produced in the tensed portion of the resilient member, is added a "dynamic" tensile strain due to a vibrational load externally applied to the bushing (resilient member). Thus, the tensed portion of the resilient member is subjected to the sum of the "static" and "dynamic" tensile strains when in use, and accordingly fissures tend to be produced in the resilient member.

In the conventional fluid-filled resilient bushings indicated above, the input low-frequency vibrations can be effectively damped due to inertia and resonance of the fluid mass in the orifice. However, if the orifice of this type of fluid-filled resilient bushing is dimensioned (in terms of its length and cross sectional area or diameter) so as to provide excellent damping characteristic for vibrations in a low frequency range, then the vibration isolating capability of the bushing is accordingly reduced for the high-frequency vibrations having a small amplitude. The conventional bushings having a pair of diametrically opposite fluid chambers cannot effectively isolate vibrations having a frequency higher than the resonance point of the fluid mass in the orifice, because the fluid mass in each fluid chamber becomes too rigid or stiff and accordingly the dynamic spring constant of the bushing becomes too high when such high-frequency vibrations are applied to the bushing.

The present inventor has proposed in Japanese patent application No. 59-267768, filed Dec. 19, 1984, a fluid-filled resilient bushing of a type which has a pressure-receiving chamber adapted to receive axial vibrations to be damped, and an equilibrium chamber partially defined by an elastically yieldable thin-walled partition member. The pressure-receiving chamber and the equilibrium chamber communicate with each other through an orifice, and elastic deformation of the partition member permits a change in the volume of the equilibrium chamber. In this arrangement, the volume of the pressure-receiving chamber can be changed with flows of the fluid between the two chambers through the orifice, accompanied by elastic deformation of the partition member of the equilibrium chamber. In this way, the bushing provides damping effect against vibrations axially applied thereto, however it is not adapted to damp vibrations radially applied thereto.

SUMMARY OF THE INVENTION

It is therefore an object of the present invention to provide an improved fluid-filled resilient bushing which can be used for a longer period.

It is another object of the invention to provide a fluid-filled resilient bushing which has a resilient member whose durability is increased.

The above object may be achieved according to the present invention, which provides a fluid-filled resilient bushing, comprising: (a) an inner sleeve; (b) an outer sleeve disposed in radially outwardly spaced-apart relation with the inner sleeve; (c) a generally annular resilient member interposed between the inner and outer sleeves so as to connect the inner and outer sleeves, and having a pocket and an axial void which are located opposite to each other in a diametric direction of the inner sleeve parallel to a vibration-input direction in which the bushing is adapted to receive a vibrational load, the void being formed over an entire axial length of the bushing, the inner and outer sleeves being disposed eccentrically with each other in the vibration-input direction, the outer sleeve and the resilient member cooperating to define a fluid-tight pressure-receiving chamber such that the pocket is fluid-tightly closed by the outer sleeve, the pressure-receiving chamber being filled with an incompressible fluid; (d) an elastically yieldable thin-walled partition member disposed in the axial void, so as to form at least one recess, the outer sleeve and the partition member cooperating to define at least one equilibrium chamber such that the at least one recess is fluid-tightly closed by the outer sleeve, the at least one equilibrium chamber being filled with the incompressible fluid; and (e) means for defining at least one orifice which communicates with the pressure-receiving chamber and the at least one equilibrium chamber, and which permits flows of the incompressible fluid between the pressure-receiving chamber and the at least one equilibrium chamber.

In the fluid-filled resilient bushing of the present invention constructed as described above, the resilient member is free from the conventionally encountered problem that fissures tends to take place in a resilient member of a bushing while the bushing is in service. The axial void is formed over an entire axial length of the resilient member (or the bushing), and substantially no portion of the resilient member is tensed when the bushing is mounted in place. Thus, the resilient member of the present bushing is free from static tensile strain that has been the cause to produce fissures in the resilient members of the conventional bushings having a pair of diametrically opposite fluid chambers. As a result, the durability of the resilient member of the present bushing is increased, and accordingly the bushing can be used for a longer period than the conventional bushings.

The above-indicated resilient member of the present bushing also contributes to improving the vibration isolating capability of the bushing, as means for holding the dynamic spring constant of the bushing at a comparatively low level even when high-frequency small-amplitude vibrations are applied to the bushing. Since the pressure-receiving chamber of the bushing is held considerably soft even when such high-frequency vibrations are applied to the bushing, due to existence of the axial void whose volume is easily variable under such conditions, the overall rigidity or stiffness of the bushing under the conditions is held relatively low, as compared with the above-identified conventional bushings. Hence, the present fluid-filled resilient bushing exhibits better vibration isolating characteristic over the conventional bushings, and therefore provides improved overall damping and isolating capability for the vibrations applied in the diametric direction in which the pressure-receiving chamber and the axial void are arranged in mutually opposed relation.

According to one feature of the present invention, the inner and outer sleeves are brought into concentric relation with each other when the bushing is mounted in place, for example between a body of a vehicle and a power unit including an engine.

According to another feature of the invention, a center line of the inner sleeve is positioned a predetermined distance apart from a center line of the outer sleeve, in a direction of movement of the outer sleeve relative to the inner sleeve due to gravity when the bushing is mounted in place.

In accordance with one form of the above feature of the invention, the pocket is located nearer to the center line of the outer sleeve than to the center line of the inner sleeve, while the axial void is located nearer to the center line of the inner sleeve than to the center line of the outer sleeve.

In accordance with another form of the above feature of the invention, when the bushing is mounted in place, a substantially whole portion of the resilient member is located on a pressure-receiving-chamber side of a plane on which side the pressure-receiving chamber is provided, the plane being the remoter one from the pressure-receiving chamber of a pair of planes which are perpendicular to the vibration-input direction and tangent to an outer circumferential surface of the inner sleeve.

According to a further feature of the invention, the elastically yieldable partition member includes a pair of partition walls defining a pair of recesses which cooperate with the outer sleeve to define a pair of equilibrium chambers.

According to a still further feature of the invention, the means for defining an orifice comprises an intermediate sleeve disposed between the outer sleeve and the resilient member and having a plurality of apertures each of which is aligned with a corresponding one of openings of the pocket and the at least one recess of the resilient member. The intermediate sleeve has at least one circumferential groove formed in an outer circumferential surface thereof, and the orifice is formed such that the at least one circumferential groove is closed by the outer sleeve and is open at opposite ends thereof in both the pressure-receiving chamber and a corresponding one of the at least one equilibrium chamber.

According to another feature of the invention, the pocket is formed in an axially middle portion of the generally annular resilient member According to a further feature of the invention, the bushing further comprises a stopper block supported by the inner sleeve, and having a stopper portion which is disposed within the pressure-receiving chamber and which extends from a bottom of the pocket, substantially in the vibration-input direction. The stopper portion has a radial end face spaced apart from the outer sleeve by a predetermined radial distance in the vibration-input direction, and the radial end face is abuttable upon the outer sleeve when an excessively large vibrational load is exterted to the bushing. In one form of this feature of the invention, the stopper block has another stopper portion disposed within the axial void.

In the bushing having the above-indicated feature of the invention, the stopper block serves for protecting the resilient member disposed between the inner and outer sleeves, from excessive elastic deformation upon excessive relative displacement between the two sleeves in the diametric direction in which the pressure-receiving chamber and the axial void are disposed. Stated differently, the stopper portion or portions of the stopper block prevents an excessive amount of relative displacement between the two members which are connected to the inner and outer sleeves of the bushing. Owing to the stopper block, the durability of the resilient member is enhanced, and the service life of the present bushing is further prolonged.

According to another feature of the invention, the partition member is formed as an integral part of the resilient member.

BRIEF DESCRIPTION OF THE DRAWINGS

The above and optional objects, features and advantages of the present invention will become more apparent by reading the following detailed description of a preferred embodiment of the invention, when considered in conjunction with the accompanying drawings, in which.

DETAILED DESCRIPTION OF THE PREFERRED EMBODIMENT

To clarify the concept of the present invention, the cylindrical engine mount for an F—F (front-engine front-drive) vehicle, constructed according to one embodiment of the invention, will be described in detail, by reference to the accompanying drawings. The engine mount is used for mounting a power unit on the body of the F—F vehicle.

Figure 1:
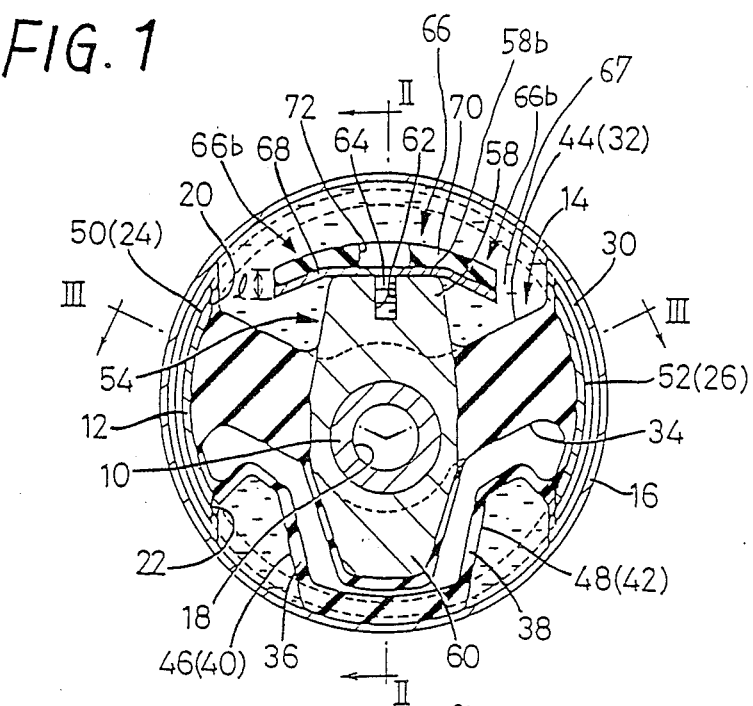
FIG. 1 is an elevational view in axial cross section of one embodiment of a fluid-filled resilient bushing of the invention in the form of an engine mount for an automotive vehicle of a front-engine, front-drive type.
Figure 3:
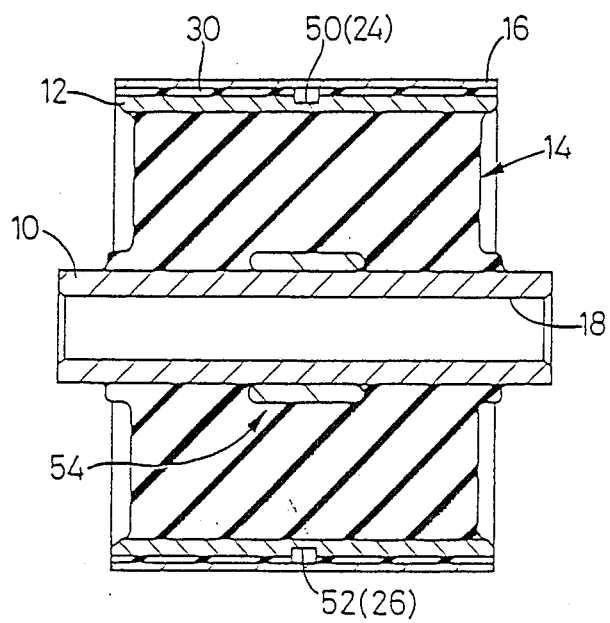

Referring first to FIGS. 1 and 3, reference numerals 10 and 12 designate an inner sleeve and an intermediate or third sleeve, respectively, both of which are made of metallic materials. The inner sleeve and the third sleeve are disposed eccentrically with each other in a diametric direction of the bushing. A resilient member in the form of a generally annular rubber block 14 is interposed between the inner and third sleeves 10, 12 so as to elastically connect these sleeves. An outer sleeve 16 made of a metallic material is fitted on the outer surface of the third sleeve 12. The present engine mount is installed between the power unit and the body of the vehicle, such that a cylindrical fitting secured to one of the two members of the vehicle is fitted on the outer surface of the outer sleeve 16, while a mounting rod secured to the other of the two members is inserted through a bore 18 of the inner sleeve 10. The inner and outer sleeves 10, 16 (the inner and third sleeves 10, 12) are brought into concentric relation with each other when the resilient bushing is installed in place while receiving the weight of the power unit. That is, the inner and outer sleeves 10, 16 are disposed such that the center line of the inner sleeve 10 is positioned a predetermined distance apart from the center line of the outer sleeve 16, in a direction of movement of the outer sleeve relative to the inner sleeve due to gravity when the bushing is mounted in place. The rubber block 14 is integrally secured to the outer surface of the inner sleeve 10 and the inner surface of the third sleeve 12 by means of vulcanization.

Figure 4:
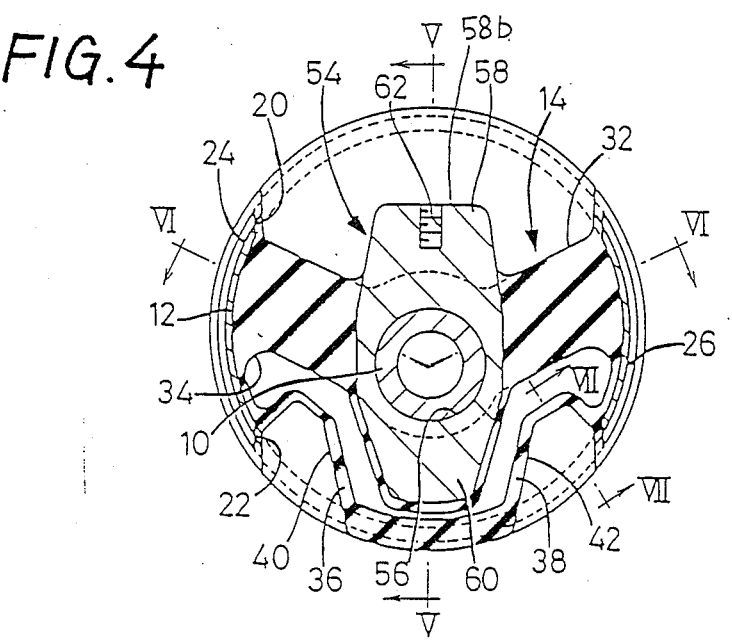
FIG. 4 is a cross sectional view corresponding to that of FIG. 1, showing an assembly of the bushing including a rubber block secured to metallic members by vulcanization, before attachment of an outer sleeve to the inner assembly.
Figure 6:
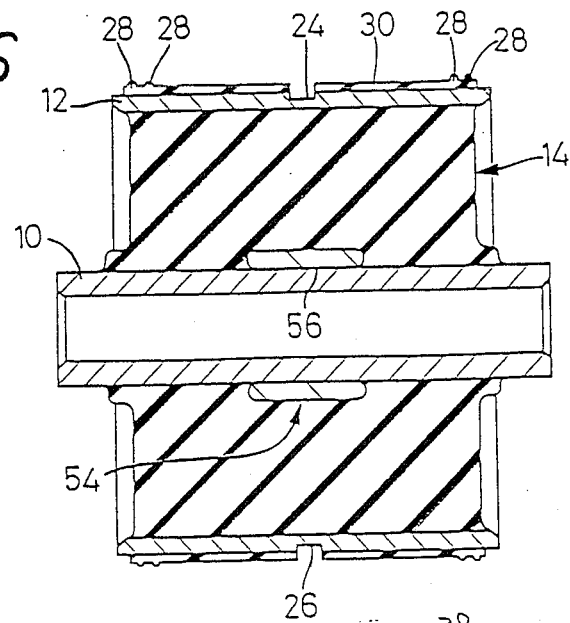
Figure 7:
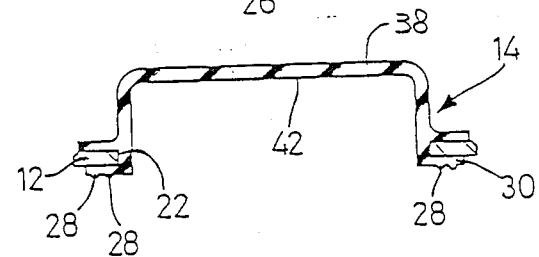

The third sleeve 12 secured to the outer circumferential surface of the rubber block 14 has a pair of apertures 20, 22. As shown in FIGS. 4 and 6, these apertures 20, 22 are disposed opposite to each other in a diametric direction of the bushing in which the bushing receives a vibrational load. This direction is hereinafter referred to as "vibration-input direction". In diametrically opposite portions of the outer circumferential surface of the third sleeve 12, there are formed a pair of circumferential grooves 24, 26 for connecting the appertures 20, 22. Further, a sealing rubber layer 30 is secured by vulcanization to the entire outer surface of the third sleeve 12, except its areas in which the circumferential grooves 24, 26 are open. The sealing rubber layer 30 is formed as an integral part of the rubber block 14 and has a pair of sealing lips 28 at each of the opposite axial ends of the bushing.

Reference is now made to FIGS. 4-7. In an axially middle portion of the rubber block 14, there is formed a pocket 32 which is aligned with the aperture 20 in the third sleeve 12. The rubber block 14 further has a void 34 aligned with the other aperture 22, such that the void 34 extends over an entire axial length of the rubber block 14. The pocket 32 is located nearer to the center line of the outer sleeve 16 than to that of the inner sleeve 10, while the axial void 34 is positioned nearer to the center line of the inner sleeve 10 than to that of the outer sleeve 16. There is disposed in the void 34 an elastically yieldable thin-walled partition member in the form of a pair of partition walls or members 36, 38. The partition walls 36, 38 are adapted to form a pair of recesses 40, 42, respectively, which are spaced apart from each other by a certain distance in the circumferential direction of the rubber block 14. Each of the recesses 40, 42 is aligned with the corresponding portions of the aperture 22 and communicates with the pocket 32 through corresponding one of the circumferential grooves 24, 26. The partition walls 36, 38 are materially connected to the rubber block 14 and thereby to each other, at a relatively thick-walled circumferential portion or member of the bushing between the openings of the two recesses 40, 42, as most clearly indicated in FIG. 4.

Figure 2:
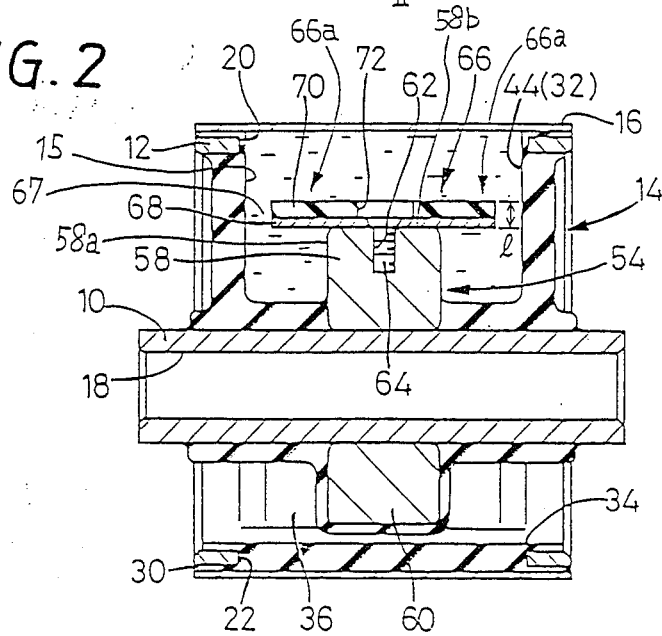
FIG. 2 and FIG. 3 are elevational views in transverse cross section of the resilient bushing, taken along lines II—II and III—III of FIG. 1, respectively.

In the present resilient bushing, the outer sleeve 16 is fitted on the third sleeve 12 which is secured to the outer circumferential surface of the rubber block 14, as illustrated in FIGS. 1 through 3, such that the pocket 32 and the recesses 40, 42, as well as the apertures 20, 22, are fluid-tightly closed by the outer sleeve 16. Thus, the outer sleeve 16 and the rubber block 14 cooperate to define a pressure-receiving chamber 44 which corresponds to the pocket 32, and a pair of equilibrium chambers 46, 48 which correspond to the recesses 40, 42. The circumferential grooves 24, 26 are also fluid-tightly closed by the outer sleeve 16, whereby a pair of orifices 50, 52 are formed. These orifices permit restricted fluid flows between the pressure-receiving chamber 44 and each of the equilibrium chambers 46, 48. In the present embodiment, an operation to fit the outer sleeve 16 onto the third sleeve 12 is carried out within a mass of a suitable incompressible fluid such as water, alkylene glycols, polyalkylene glycols, silicone oil, low molecular weight polymers, or a mixture thereof. In this fitting process, the pressure-receiving chamber 44 and each of the equlibrium chambers 46, 48 are filled with the incompressible fluid.

In assembling the instant bushing, the outer sleeve 16 fitting on the rubber block 14 is subjected to a suitable drawing operation to compress the third sleeve 12 in the radially inward direction. The drawing operation may be achieved, for example, by using eight dies disposed around the outer sleeve 16. The thus obtained bushing is further subjected to a suitable drawing operation.

The length and cross sectional area of the orifices 50, 52 are determined so that vibrations of a desired relatively low frequency range can be effectively damped due to inertia and resonance of the fluid masses in the orifices 50, 52 when the fluid is forced to flow through these orifices between the pressure-receiving chamber 44 and the equilibrium chambers 46, 48.

Figure 5:
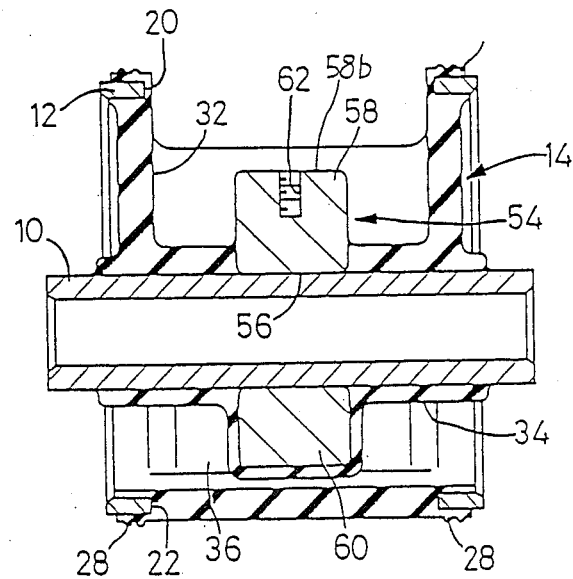
FIGS. 5, 6 and 7 are cross sectional views of the assembly of FIG. 4, taken along lines V—V, VI—VI and VII—VII of FIG. 4.

On the outer surface of an axially intermediate portion of the inner sleeve 10 secured to the inner surface of the rubber block 14, there is press-fitted a stopper block 54, such that a center bore 56 formed in the middle portion of the block 54 engages the outer surface of the inner sleeve 10, as indicated in FIGS. 4 through 6. The stopper block 54 has a generally elongate shape in transverse cross section as indicated in FIG. 4, and has a predetermined axial dimension as shown in FIG. 5. The stopper block 54 includes a base portion, and a pair of stopper portions 58, 60 which extend by a suitable dimension in the radial direction of the bushing, from the diametrically opposite ends of the base portion toward the pocket 34 and the void 34, respectively. The stopper portions 58, 60 are located opposite to each other in the vibration-input direction.

In the present embodiment, the stopper portions 58, 60 are adapted to prevent an excessive amount of relative displacement between the power unit and the body of the vehicle which are connected to the inner and outer sleeve 10, 16. As seen in FIG. 2, the stopper portion 58 within the pressure-receiving chamber 44 has a pair of side surfaces 58a which face the axially opposed surfaces 15 of the rubber block 14 defining an axial dimension of the pressure-receiving chamber 44. The side surfaces 58a are spaced apart from the corresponding axially opposed surfaces 15 of the rubber block 14, by a predetermined axial distance. The stopper portion 58 has a radial end face 58b which is spaced apart from the outer sleeve 16 by a predetermined radial distance in the vibration-input direction. The periphery of the radial end face 58b is spaced apart from the periphery of the pressure-receiving chamber 44, more precisely, from the axially opposed surfaces 15, 15 of the rubber block 14, and the inner circumferential surface of the third sleeve 12, in the direction perpendicular to the vibration-input direction. Thus, the periphery of the radial end face 58b of the stopper portion 58 cooperates with the periphery of the pressure-receiving chamber 44, to define therebetween an annular spacing in a plane perpendicular to the vibration-input direction and parallel to the axis of the bushing.

The rubber block 14 is secured by vulcanization to the inner sleeve 10 on which the stopper block 54 is press-fitted. The stopper portion 60 of the stopper block 54 which is disposed in the void 34 is covered with a rubber layer having a suitable thickness. This rubber layer is an integral part of the rubber block 14.

In the present resilient bushing, a restrictor member 66 is fixedly disposed on the radial end face 58b of the stopper portion 58 within the pressure-receiving chamber 44. As shown in FIGS. 1 and 2, the restrictor member 66 is attached to the radial end face 58b by a screw 64 threaded in a tapped hole 62 formed in the stopper portion 58. The restrictor member 66 has a generally arcuate shape in transverse cross section of the bushing (FIG. 1), and a rectangular shape in axial cross section of the bushing (FIG. 2). The restrictor member 66 has a peripheral portion consisting of a pair of axial projections 66a and a pair of circumferential projections 66b. The axial projections 66a project a suitable distance in the axial direction of the bushing, from the side surfaces 58b of the stopper portion 58 of the stopper block 54, more precisely, from the axial ends of the radial end face 58b, so that the ends of the axial projections 66a are spaced apart from the corresponding axially opposed surfaces 15 of the rubber block 14 by a suitable axial distance. The circumferential projections 66b project from the periphery of the radial end face 58b in substantially the circumferential direction of the bushing, such that the ends of the projections 66b are spaced apart from the periphery of the pressure-receiving chamber 44, more precisely, from the inner circumferential surface of the third sleeve 12, in the direction perpendicular to the vibration-input direction.

Thus, the axial and circumferential projections 66a, 66b of the restrictor member 66 cooperate with the axially opposed surfaces 15, 15 of the rubber block 14 and the inner surface of the third sleeve 12, to define therebetween a rectangularly annular gap 67 in the plane perpendicular to the vibration-input direction and parallel to the axial direction of the bushing. This annular gap 67 is obviously smaller than the aforementioned annular spacing formed around the periphery of the radial end face 58b of the stopper portion 58, since the projections 66a, 66b project from the periphery of the radial end face 58b. Thus, the axial and circumferential projections 66a, 66b substantially divide the pressure-receiving chamber 44 into a radially inner section and a radially outer section, which communicate with each other through the comparatively narrow annular gap 67. When a vibrational load is applied to the bushing in the direction (vibration-input direction) in which the pressure-chamber 44 and the void 34 are disposed, the incompressible fluid is forced to flow between the radially inner and outer sections of the pressure-receiving chamber 44, in the radial direction of the bushing, through the annular gap 67.

The stopper portion 58 of the stopper block 54 and the restrictor member 66 serve as damping means disposed within the pressure-receiving chamber 44, primarily for isolating high-frequency vibrations having a small amplitude. More specifically stated, a dimension of the axial and circumferential projections 66a, 66b as measured in the vibration-input direction, and an area of the annular gap 67 as measured in the plane perpendicular to the vibration-input direction and parallel to the axial direction of the bushing, are determined so that vibrations having a frequency range higher than that of the vibrations to be damped by the orifices 50, 52 may be effectively isolated, due to inertia of a mass of the incompressible fluid existing in the annular gap 67, and due to resonance of the fluid mass adjacent to the projections 66a, 66b, when the fluid is forced to flow through the annular gap 67 in the radial direction of the bushing upon application of such vibrations having comparatively high frequencies.

The restrictor member 66 consists of an inner metallic portion 68, and an outer rubber layer 70 secured to the outer surface of the inner metallic portion 68 by means of vulcanization. Reference number 72 in FIGS. 1 and 2, designates an access hole formed in the rubber layer 70, for driving the screw 64 into the tapped hole 62.

When the fluid-filled resilient bushing of the invention constructed as described above is installed in place, a substantially whole portion of the resilient member 14 is located on a pressure-receiving-chamber side of the inner sleeve 10 on which side the pressure-receiving chamber 44 is provided, more precisely, on an upper side of a plane tangent to the lower end of the inner sleeve 10. Thus, substantially no portion of the resilient member 14, when the bushing is mounted in place, is tensed due to the weight or static load of the power unit including an engine (not shown), and accordingly the resilient member 14 does not suffer from any static tensile strain. The resilient member 14 is subjected to only a dynamic tensile strain due to the vibrations applied to the bushing. As a result, the present bushing is free from the conventionally encountered problem that fissures tend to be produced in the resilient member due to a comparatively large tensile strain as the sum of the static and dynamic tensile strain. Thus, the durability of the resilient member 14 is increased, and the service life of the bushing is prolonged.

Further, in the present fluid-filled bushing, the incompressible fluid is forced to flow through the orifices 50, 52 between the pressure-receiving chamber 44 and the equilibrium chambers 46, 48, when the bushing receives low-frequency vibrations of a large amplitude in the direction of arrangement of the chamber 44 and the void 34, causing a relative displacement between the inner and third sleeves 10, 12. In this event, the input low-frequency vibrations can be effectively damped, due to inertia and resonance of the fluid mass in the orifices 50, 52. It is noted that elastic expansion of the elastically yieldable partition walls 36, 38 permits the fluid to flow from the pressure-receiving chamber 44 into the equilibrium chambers 46, 48. The fluid in the expanded equilibrium chambers 46, 48 flows into the pressure-receiving chamber 44 due to elastic contraction of the partition walls 36, 38.

Where the vibrations applied to the bushing have a relatively high frequency and a relatively small amplitude, the fluid is less likely or difficult to flow through the orifices 50, 52, and the dynamic spring constant of the bushing cannot be reduced to an extent sufficient to isolate such high-frequency small-amplitude vibrations. In this case, however, the high-frequency vibrations applied to the bushing cause restricted flow of the fluid through the annular gap 67 formed within the pressure-receiving chamber 44, whereby the high-frequency vibrations can be effectively isolated due to inertia and resonance of the fluid mass present in the annular gap 67, while the fluid is forced to flow between the radially inner and outer sections of the pressure-receiving chamber 44. Therefore, the present fluid-filled resilient bushing is capable of exhibiting improved high-frequency vibration isolating characteristic, over the conventional counterpart without such an annular gap (67).

In this connection, it is noted that the axial void 34 formed in the resilient member 14 opposite to the pressure-receiving chamber 44 contributes to holding the dynamic constant spring of the bushing comparatively low even when the high-frequency vibrations are applied to the bushing, since the volume of the void 34 is easily varied even under such conditions and accordingly the fluid mass in the chamber 44 is maintained relatively soft. This is another advantage with the axial void 34 of the resilient member 14.

It is understood from the foregoing that the the present engine mount bushing is equivalent to the conventional bushing n terms of damping characteristic for low-frequency vibrations of a large amplitude, and is significantly improved over the conventional bushing, in terms of isolating characteristic for high-frequency vibrations of a small amplitude. This indicates totally improved vibration damping and isolating capability of the fluid-filled engine mount constructed according to the present invention.

The above-indicated arrangement is significantly simpler in construction and more economical to manufacture, than the conventional engine mount.

Furthermore, the stopper portions 58, 60 disposed within the pressure-receiving chamber 44 and the axial void 34 are adapted to be abuttable at their radial end faces upon the outer sleeve 16, in the event that the inner sleeve 10 and the outer sleeve 16 are excessively displaced relative to each other in the vibration-input direction. As is apparent from FIGS. 1, 2, 4 and 5, the radial end face of stopper portion 60 is abuttable with outer sleeve 16 through the thick-walled circumferential member between relatively thin-walled partition members 36, 38. Stated differently, the stopper blocks 54 and 60 prevents an excessive amount of relative displacement between the power unit and the body of the vehicle. Moreover, this arrangement is advantageous in preventing the resilient member 14 from excessively large elastic deformation that is otherwise produced therein in the event of such a large displacement between the inner and outer sleeves 10, 16, thereby contributing to enhancing the durability of the resilient member 14.

While the present invention has been described in its preferred embodiment with a certain degree of particularity, for illustrative purpose only, it is to be understood that the invention is by no means confined to the precise details of the illustrated embodiment, but may be otherwise embodied.

For instance, in the illustrated embodiment, the third sleeve 12 has the single common aperture 22 whose circumferential end portions are aligned with the respective recesses 40, 42 corresponding to the two equilibrium chambers 46, 48. However, it is possible that the third sleeve 12 has two separate apertures alinged with the respective recesses 40, 42. It is further possible to provide a single equilibrium chamber, or to adapt only one of the recesses 40, 42 to provide a single equilibrium chamber.

While the illustrated embodiment of the fluid-filled bushing has been described as an engine mount for the F—F (front-engine front-drive) vehicle, the present bushing may also be used for the other purposes, for example, as a bushing for the suspension system of an automotive vehicle.

While in the illustrated embodiment the stopper portion 58 is provided as an intergral part of the stopper block 54, it is possible to employ a separate stopper portion (58) and fix it to a portion of the rubber block 14 located at the bottom of the pocket 32.

Furthermore, while the partition wall 36, 38 is formed as an integral part of the rubber block 14 in the illustrated embodiment, the partition wall or walls may be formed separate from the rubber block 14.

It is further to be understood that the invention may be embodied with various other alterations, modifications and improvements which may occur to those skilled in the art, without departing from the spirit and scope of the invention defined in the following claims.

I claim:

1. A fluid-filled resilient bushing, comprising:
an inner sleeve;
an outer sleeve disposed in a radially outwardly spaced-apart relationship with said inner sleeve;
a generally annular resilient member interposed between said inner and outer sleeves so as to connect the inner and outer sleeves, and having a pocket and an axial void which are located opposite to each other in a diametric direction of said inner sleeve parallel to a vibration-input direction in which the bushing receives a vibrational load, said void being formed over an entire axial length of said resilient member, said inner and outer sleeves being disposed eccentrically with respect to each other in said vibration-input direction,
said outer sleeve and said annular resilient member cooperating to define a fluid-tight pressure-receiving chamber such that said pocket is fluid-tightly closed by the outer sleeve, said pressure-receiving chamber being filled with an incompressible fluid;
a pair of elastically yieldable thin-walled partition members disposed in said axial void, so as to form a pair of recesses, respectively, said outer sleeve and said pair of partition members cooperating to define a pair of equilibrium chambers such that said pair of recesses are fluid-tightly closed by the outer sleeve, said pair of equilibrium chambers being filled with said incompressible fluid, said pair of partition members being spaced apart from said inner sleeve due to said axial void located therebetween;

a thick-walled resilient member disposed along an inner circumferential surface of said outer sleeve between said pair of thin-walled partition members, said pair of thin-walled partition members being connected to said thick-walled resilient member;

a stopper block supported by said inner sleeve, and having a stopper portion disposed in said axial void, said stopper portion extending between said pair of thin-walled partition members substantially in said vibration-input direction toward said thick-walled resilient member, and being abuttable upon said thick-walled resilient member when an excessively large vibrational load is exerted to the bushing in said vibration-input direction; and means for defining a pair of orifices each of which communicates with said pressure-receiving chamber and a corresponding one of said pair of equilibrium chambers, and which permits flows of said incompressible fluid between the pressure-receiving chamber and said corresponding one of the pair of equilibrium chambers.

2. A fluid-filled resilient bushing according to claim 1, wherein said inner and outer sleeves are brought into concentric relation with each other when the bushing is mounted in place.

3. A fluid-filled resilient bushing according to claim 1, wherein a center line of said inner sleeve is positioned a predetermined distance apart from a center line of said outer sleeve, in a direction of movement of the outer sleeve relative to the inner sleeve due to gravity when the bushing is mounted in place.

4. A fluid-filled resilient bushing according to claim 3, wherein said pocket is located nearer to the center line of said outer sleeve than to the center line of said inner sleeve, while said axial void is located nearer to the center line of said inner sleeve than to the center line of said outer sleeve.

5. A fluid-filled resilient bushing according to claim 3, wherein, when the bushing is mounted in place, a substantially whole portion of said resilient member is located on a pressure-receiving-chamber side of a plane on which side said pressure-receiving chamber is provided, said plane being a remoter one from said pressure-receiving chamber of a pair of planes which are perpendicular to said vibration-input direction and tangent to an outer circumferential surface of said inner sleeve.

6. A fluid-filled resilient bushing according to claim 1, wherein said means for defining a pair of orifices comprises an intermediate sleeve disposed between said outer sleeve and said resilient member and having a plurality of apertures each of which is aligned with a corresponding one of said pocket and said pair of recesses of said annular resilient member, said intermediate sleeve having a pair of circumferential grooves formed in an outer circumferential surface thereof, said pair of orifices being formed such that said pair of circumferential grooves are closed by said outer sleeve and each are open at opposite ends thereof in both said pressure-receiving chamber and said corresponding one of said pair of equilibrium chambers.

7. A fluid-filled resilient bushing according to claim 1, wherein said pocket is formed in an axially middle portion of said generally annular resilient member.

8. A fluid-filled resilient bushing according to claim 1, wherein said stopper block has another stopper portion which is disposed within said pressure-receiving chamber and which extends from a bottom of said pocket, substantially in said vibration-input direction, said another stopper portion having a radial end face spaced apart from said outer sleeve by a predetermined radial distance in said vibration-input direction, said radial end face being abuttable upon said outer sleeve when an excessively large vibration load is exerted to the bushing in the vibration-input direction.

9. A fluid-filled resilient bushing according to claim 1, wherein said pair of thin-walled partition members are formed as integral parts of said annular resilient member.

* * * * *